United States Patent
Saund et al.

(10) Patent No.: US 7,246,958 B2
(45) Date of Patent: Jul. 24, 2007

(54) HAND-PROPELLED WAND PRINTER

(75) Inventors: Eric Saund, San Carlos, CA (US); Babur B. Hadimioglu, Stockholm (SE); David L. Hecht, Palo Alto, CA (US); John S. Fitch, Los Altos, CA (US); Stephen D. White, Santa Clara, CA (US); Richard J. Goldstein, deceased, late of Menlo Park, CA (US); by Marina LaPalma, legal representative, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 212 days.

(21) Appl. No.: 10/988,905

(22) Filed: Nov. 15, 2004

(65) Prior Publication Data

US 2005/0135857 A1 Jun. 23, 2005

Related U.S. Application Data

(60) Provisional application No. 60/530,573, filed on Dec. 18, 2003.

(51) Int. Cl.
*B41J 3/36* (2006.01)
*B41J 29/38* (2006.01)
*B41J 3/28* (2006.01)

(52) U.S. Cl. .......................................... 400/88; 400/76
(58) Field of Classification Search .................... None
See application file for complete search history.

(56) References Cited

U.S. PATENT DOCUMENTS

| 5,511,148 | A | 4/1996 | Wellner |
| 5,561,449 | A | 10/1996 | Raskin et al. |
| 5,593,236 | A | 1/1997 | Bobry |
| 5,927,872 | A | 7/1999 | Yamada |
| 5,988,900 | A | 11/1999 | Bobry |
| 6,067,112 | A | 5/2000 | Wellner et al. |
| 6,357,939 | B1 * | 3/2002 | Baron ........................ 400/88 |
| 6,517,266 | B2 | 2/2003 | Saund |
| 7,034,865 | B2 * | 4/2006 | Tojo et al. ............... 348/207.2 |

(Continued)

FOREIGN PATENT DOCUMENTS

EP  1 119 193 A  7/2001

(Continued)

OTHER PUBLICATIONS

*ScanSoft Productivity Without Boundaries*, http://www.scansoft.co.uk/omniform/omniform4/, Oct. 28, 2003, 10 pgs.

(Continued)

Primary Examiner—Daniel J. Colilla
(74) Attorney, Agent, or Firm—Fay Sharpe LLP

(57) ABSTRACT

In accordance with one aspect of the present exemplary embodiment, provided is a hand-held printer system and method for printing on a target. The system includes a hand-held printer, a target position sensing system which senses a position of the target, and a hand-held printer position sensing system which senses a position of the hand-held printer relative to a printing surface of the target. A control mechanism actuates the printing of the hand-held printer based on the sensed positions.

28 Claims, 18 Drawing Sheets

U.S. PATENT DOCUMENTS

2002/0171731 A1 11/2002 Saund
2003/0043388 A1 3/2003 Andrews et al.
2003/0051615 A1 3/2003 Denoue et al.

FOREIGN PATENT DOCUMENTS

| JP | 05050736 A * | 3/1993 |
| JP | 08224941 A * | 9/1996 |
| WO | WO 01/94118 A1 | 12/2001 |
| WO | WO 02/02343 A1 | 1/2002 |
| WO | WO 03/006249 A1 | 1/2003 |
| WO | WO 03/055688 A1 | 7/2003 |
| WO | WO 03/055689 A1 | 7/2003 |
| WO | WO-03/076198 | 9/2003 |

OTHER PUBLICATIONS

European Search Report, EP Application No. 04 02 9154, Completed Oct. 31, 2005.

European Search Report, mailed Jun. 27, 2006; EP Application No. 04029154.4-2304; Examiner T. Joosting.

* cited by examiner

FIG. 14
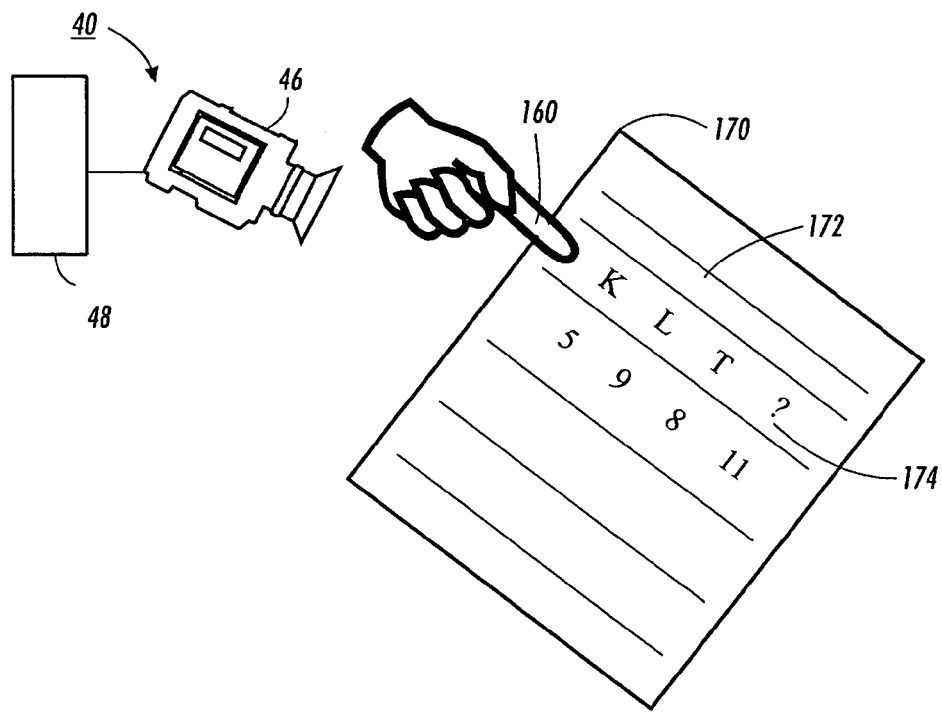
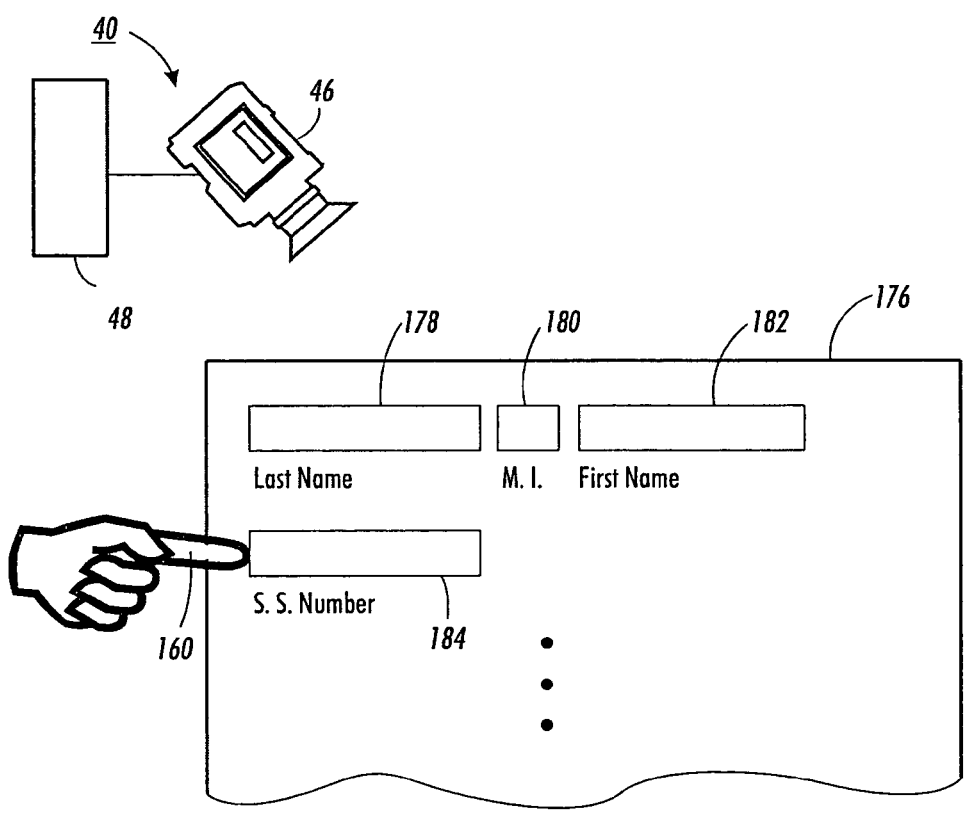
FIG. 15

HAND-PROPELLED WAND PRINTER

This application claims the benefit of Provisional Patent Application No. 60/530,573, filed Dec. 18, 2003, the disclosure of which is incorporated herein in its entirety, by reference.

BACKGROUND

The present exemplary embodiment is directed to printing, and more particularly to printing with hand-held wand printers.

For printing a stored image on a target medium such as paper, a desktop printer or portable printer has typically been employed. In such devices, the medium is fed past an ink-jet head, laser or other printing mechanism within the device so that image data is reproduced on the target. Thus, even though printers may be portable, such devices are not suitable for printing on surfaces that cannot be fed through the device. To address this issue, printers commonly referred to as hand-held or hand-propelled wand printers have been investigated. These printers are capable of printing on targets, such as "found paper", which is understood to mean the printer will print on paper which is not within the printer itself, such as paper in a binder, on envelopes, scraps of paper, etc.

One such hand-held printer is disclosed in U.S. Pat. No. 5,927,872 to Yamada. This printer has optical sensors for tracking positions of the hand-held printer relative to the surface of a print medium during a printing process. The change in position of the hand-held printer during the printing process is monitored in real time using navigation information generated by the optical sensors. Images of the surface of the print medium are captured at fixed time intervals. The optical sensors may detect printed features or slight pattern variations on the print medium, such as papers fibers or illumination patterns from reflective features and shadowed areas between raised features. Such features are used as references for determining the movement of the hand-held printer.

Another example of a hand-held wand printing device is disclosed in U.S. Pat. No. 6,517,266 to Saund. This hand-held printer system is designed for printing a stored image onto a surface. In particular, various embodiments are adapted for hand-held printing onto the surface of a whiteboard. The system includes a marking mechanism having at least one printhead. A global position sensing system senses a position of the at least one printhead, and a control mechanism actuates the at least one printhead based on the sensed position. In other embodiments, the system includes a local position sensing system that senses a position of the at least one printhead relative to a drawing surface.

Yet another hand-held printer is described in Published U.S. patent application No. 2003/0051615 to Denoue et al. This application sets forth a method and system for position-aware freeform printing in which a source image space in a source medium and a target image space in a target medium are specified. A selected image in the source image space is copied and/or optionally processed and transferred to the target image space. A controller captures the selected source image and stores the image in a memory. The image is optionally processed, and the processed and optionally formatted image is output. The controller may format the processed image to fit into the target image space by controlling the rendering of the processed image onto the target medium as the printing device is moved over the target image space in a freeform direction. The controller predicts the freeform direction that the print head will travel by detecting the motion previously traveled and adjusting the image to compensate for the predicted freeform direction.

Two U.S. patents, U.S. Pat. Nos. 5,593,236 and 5,988,900 to Bobry, disclose a hand-held and self-contained electronic printing apparatus for printing indicia on a medium disposed outside the apparatus, including a housing that can be manually positioned adjacent a surface of the medium and manually swept across a printing area on the medium during a printing sequence. A printer is disposed in the housing and has a printhead with a plurality of print elements such as ink jet nozzles for printing indicia in a selectable pattern of dots on the medium within the printing area. An electronic control circuit is disposed in the housing for controlling the printer to print indicia on the medium during a printing sequence, the control circuit having compensation for reducing image distortion based on detecting position of the nozzles during a printing sequence.

The above-noted material describes various beneficial aspects of hand-held printing. However, these systems produce an image whose orientation is determined by the initial orientation of the printer when the print swipe commences. Many uses of hand held printers involve casual printing of relatively compact regions. For example, printing a reminder note onto a notepad. For such uses, accurate alignment of the printed material with the target page is not also a priority, although at times such alignment may be desired. At other times, a user may wish to print long stretches of text, maps, or graphic art and in these cases aligned with the page is particularly appropriate.

The known art does not take into account situations where the target (e.g., page onto which the image or data is to be printed is skewed or otherwise aligned in a position other than anticipated.

For example, while Yamada '872 and Bobry '236 and '900 disclose adjusting output for movement of the printer in a curved path as opposed to a straight line, these and the other known systems do not discuss situations where the target onto which the material is to be printed is itself misaligned.

BRIEF DESCRIPTION

In accordance with one aspect of the present exemplary embodiment, provided is a hand-held printer system and method for printing on a target. The system includes a hand-held printer, a target position sensing system which senses a position of the target, and a hand-held printer position sensing system which senses a position of the hand-held printer relative to a printing surface of the target. A control mechanism actuates the printing of the hand-held printer based on the sensed positions.

In accordance with another exemplary embodiment, a printing system is shown to include a device for generating data to be printed. A hand-held printer system is used for printing on a target, and includes a hand-held printer. Also included is a target position sensing system that senses the position of the target, and a hand-held printer position sensing system that senses a position of the hand-held printer relative to a printing surface of the target. A control mechanism actuates the hand-held printer based on the sensed positions.

BRIEF DESCRIPTION OF THE DRAWINGS

FIG. 14 depicts the pointing system for identifying the print area as between ruled lines of a target;

FIG. 15 illustrates the print area as entry blocks in a pre-printed form;

DETAILED DESCRIPTION

Figure 1:
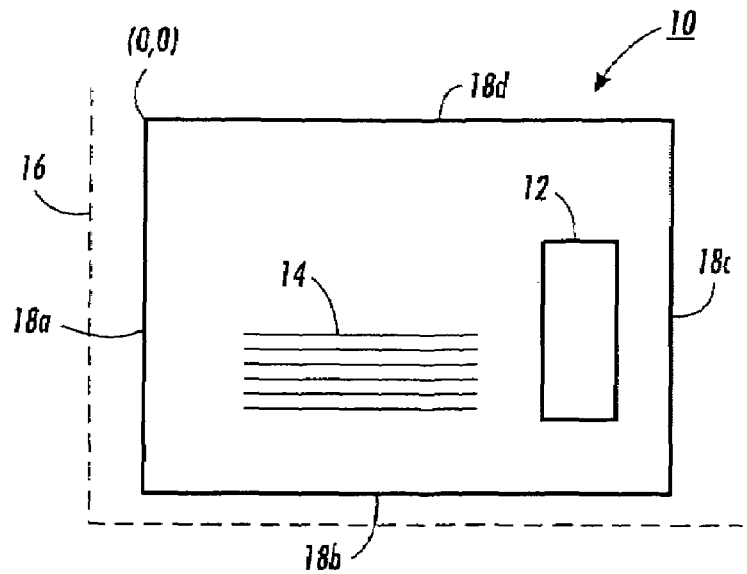
FIG. 1 illustrates a target in non-skewed position, and having been printed by a hand-held printer.
Figure 2:
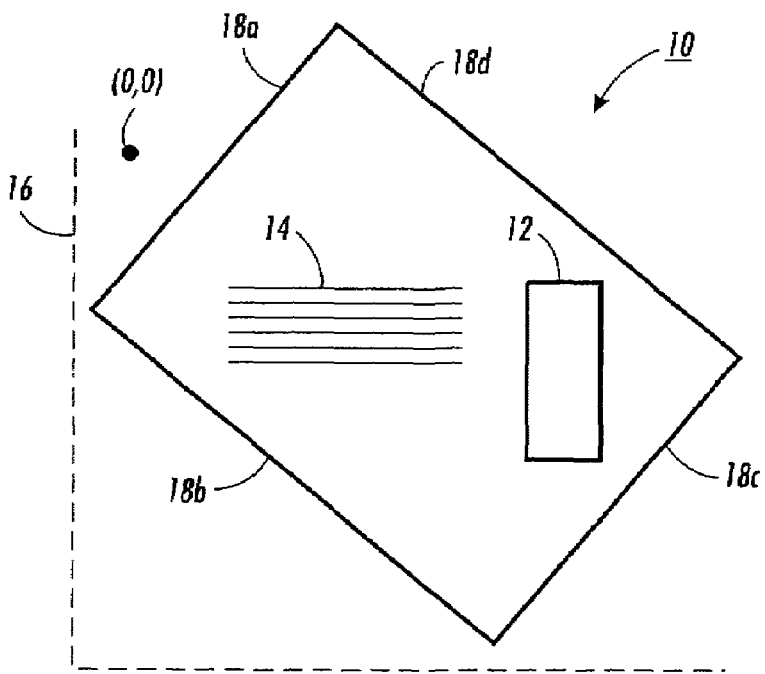
FIG. 2 illustrates a target such as in FIG. 1 in a skewed position, with non-aligned printing occurring.

In existing hand-held wand printer systems, an image will be produced whose orientation is determined by the initial orientation of the wand when a print-swipe operation commences. While in many instances a wand may be used for casual printing of relatively compact regions, for example, printing a reminder note on a notepad, in other instances a user may want to print long stretches of text, maps or graphic art. In these situations, as well as others, proper alignment with the target or page is considered beneficial. This concept is illustrated in connection with FIGS. 1 and 2. In FIG. 1, target 10, such as a piece of paper or any other surface appropriate for printing, is positioned such that its origin (i.e., 0, 0) in the x, y coordinate system is located in the upper left-hand corner, where the x,y coordinates are determined to a base reference 16. In this situation, if a hand-held wand printer 12 is swept in a straight path across the surface of target 10, a target image 14, in the form of text or graphics, is printed at a position aligned with borders of the target (i.e., page). 18a-18d However, turning to FIG. 2, target 10 is shown as being skewed, misaligned or otherwise mispositioned as related to base reference 16, whereby the upper left-hand corner is not at an expected origin (i.e., 0, 0). Then swiping wand printer 12 in a straight path across the surface of target 10 will result in the target image 14 being generated at an angle with respect to the borders 18a-18d of target 10. This is true since existing systems do not provide a capability of compensating for a skew or misalignment of the target itself.

To address this issue, the present exemplary embodiments disclose augmenting local motion sensing of a hand-held printer, such as in Yamada '872 and Bobry '236 and '900, with a target level and global level position detection of the target itself, and the position of the wand on the target. This position information is used in the printing (i.e., marking process) so as to situate the target image 14 at a predetermined location and/or skew (usually 0-skew) regardless of the starting or subsequent locations and orientations of the wand with respect to the target.

To detect the position of wand printer 12 with respect to target 10, a real-time computer vision system (e.g., as shown and discussed in connection with an overview illustration as provided by FIG. 4) is used to collect image data regarding the target 10 and wand 12.

Figure 3:
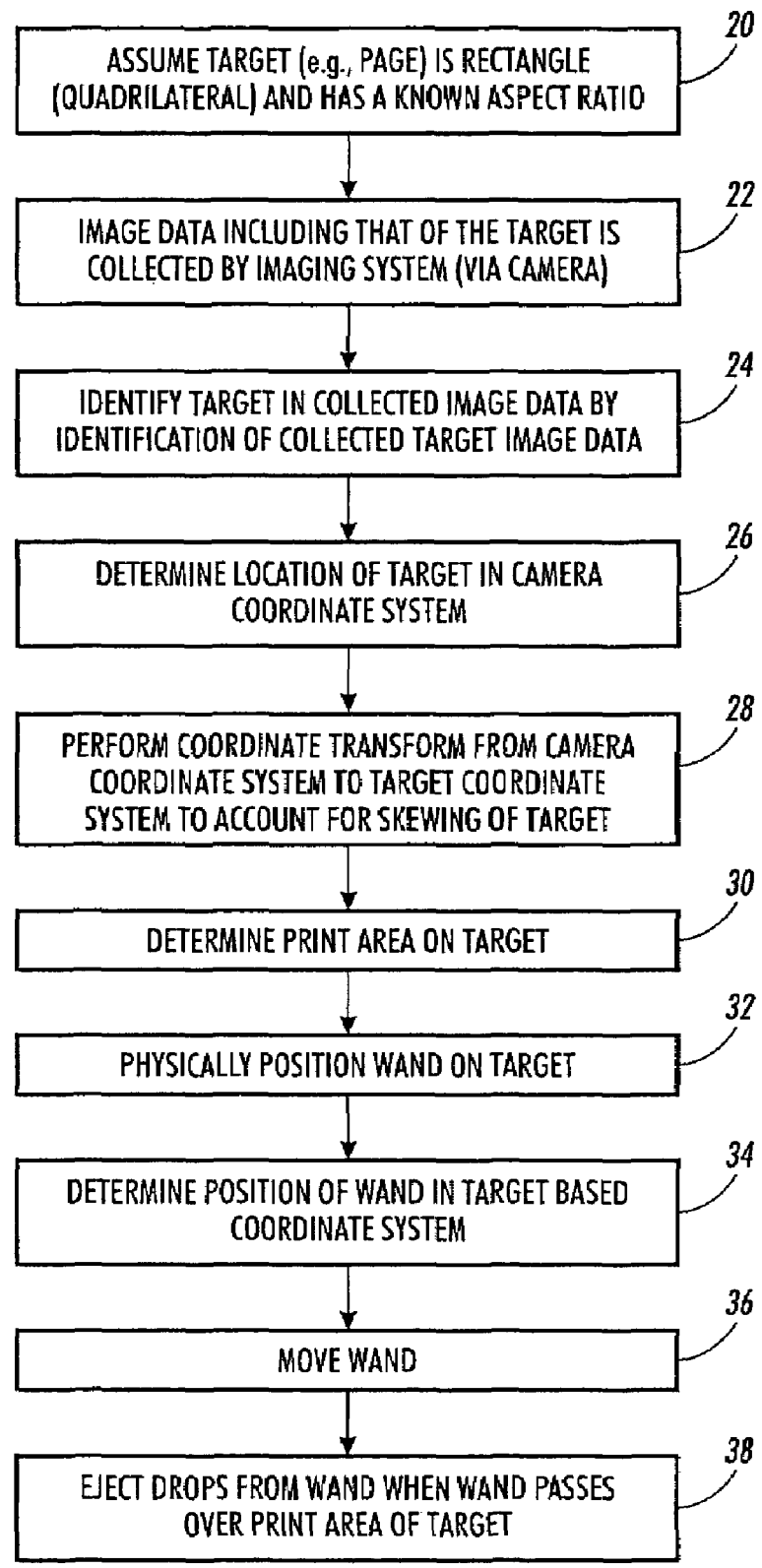
FIG. 3 is a flowchart of the operation of the present concepts in a first embodiment of an overview for a system according to the present embodiments.

FIG. 3 is a flowchart showing a target detection and calibration process implemented at the target level. In a first step 20, it is assumed a target is of a known geometric shape, such as a rectangle (or other appropriate shape) having a known aspect ratio (e.g., 8½"×11"; 11"×14"; etc.). Next, in step 22, image data including that of the target is collected by a camera of a vision collection system. The target is then identified, in step 24, using the collected image data. Based on this identification information, a location of the target in the camera coordinate system is determined. A coordinate transform from the camera coordinate system to a target coordinate system is then undertaken (step 28) to account for any skewing of the target. Next, in step 30, a print area on the target is determined, and the wand is positioned onto the target (step 32). The system then identifies the position of the wand in the target-based coordinate system, in step 34, and thereafter, upon movement of the wand (step 36) drops are ejected from at least one printhead ejector, as the wand passes over the determined print area on the target, (step 38). It is to be understood the order of the steps may be different than as set out in FIG. 3. Further, all steps may not be required. For example, in some embodiments determining the print area may not be incorporated in the process.

Figure 4:
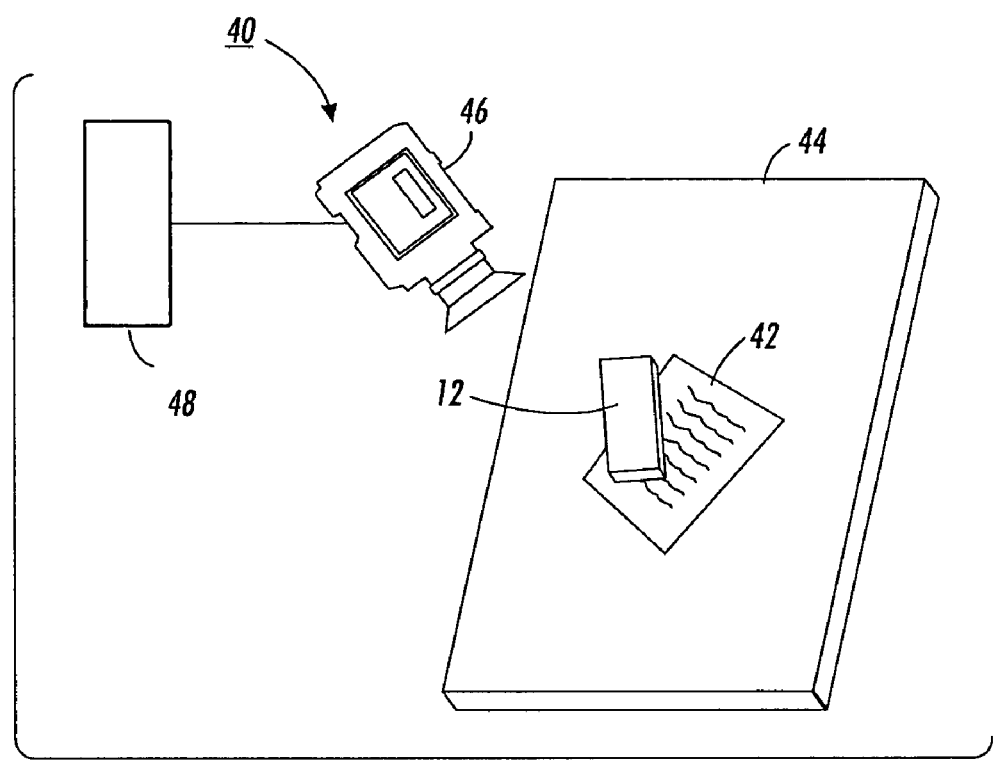
FIG. 4 illustrates an oblique perspective of the overall system.

Expanding upon the discussion of FIG. 3, attention is directed to FIG. 4, wherein a vision system 40 is positioned to view a target 42 on a surface 44. As illustrated by this FIGURE, target 42 is positioned at an angle to the edges of surface 44 on which it is placed. For this discussion its borders may represent the base reference previously discussed. Surface 44 may be a desktop, a table or other flat surface on which a target 42, such as paper or other media, is located. Vision system 40 includes a camera 46 and image controller 48, which may incorporate a variety of imaging software products dependant upon the embodiments and applications to be undertaken. As noted in step 22 of FIG. 3, camera 46 collects image data including that of the target 42, as well as other areas of surface 44. From this collected image data, the target 42 is identified through the use of object identification software incorporated in image controller 48. Software which is capable of performing this function is well known, and in this embodiment it may be of the type designed to identify borders of shapes, based on, for example, contrast between target 42 and surface 44. The above is only an example of how the imaging system may identify the target 42, and it is to be appreciated one of ordinary skill in the art could apply other known object identification software to accomplish this task.

Having programmed the system, such as in step 20, to assume the object will be a rectangle, if the image received by the imaging system 40 does not identify target 42 as a rectangle, but rather only can identify a quadrilateral, the imaging system 40 is configured to appreciate it is looking at the target 42 at an angle. For example, there may be some fore-shortening of the image which indicates to the software a distance the imaging system is from the target 42. If it is a large amount of fore-shortening, this indicates that the camera 46 is very close to target 42. Particularly, the target 42 will be represented in the long axis by a greater contracting of its lines so as to produce an illusion of projection or extension into space, in greater detail than when the image system is more distant.

As previously mentioned, the aspect ratio (i.e., length and width) of the target is known. Therefore, a comparison between the fore-shortened obtained image of target 42, with the known aspect ratio of the target 42 is used to determine an angle of the camera in relationship to the target. Using this information, any of a number of transform operations may be undertaken, such as by use of projective geometry, to transform the camera coordinates of the target to a target coordinate system.

Figure 5:
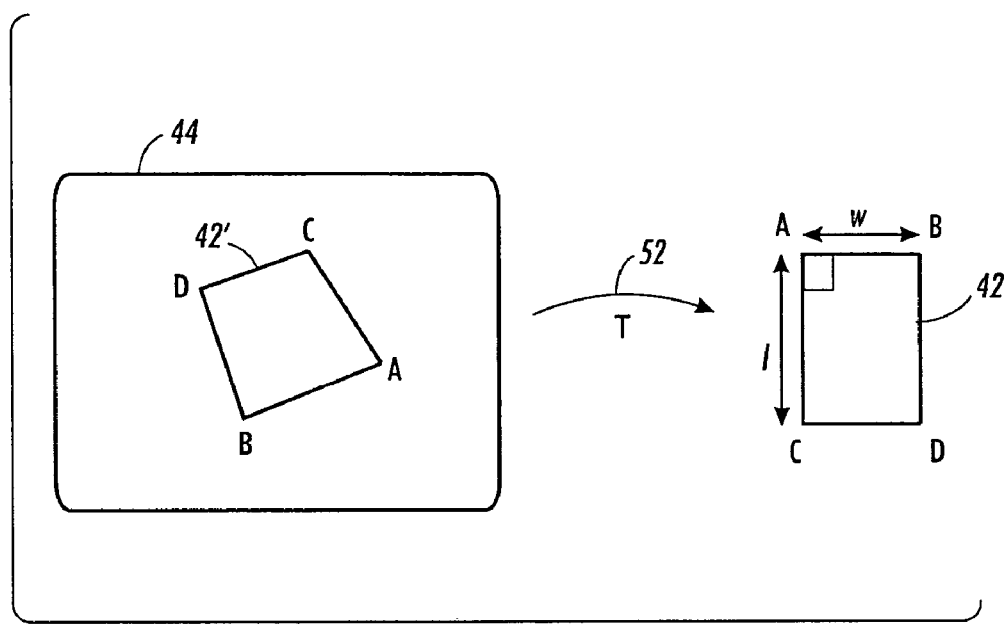
FIG. 5 depicts the transform concepts from a camera coordinate system to a target/workspace coordinate system.

Concepts of such transforms are illustratively exemplified in FIG. 5. Particularly, a target within surface 44, is depicted as a quadrilateral target 42' having points A, B, C, D. Quadrilateral target 42' is understood to be in a camera coordinate system. In this discussion "42'" is used to acknowledge the potential visual difference (i.e. foreshortening) from target 42 when viewed in the camera coordinate system.

In accordance with the present embodiments, knowing the aspect ratio of the target 42, a coordinate transform 52 is performed mapping points A, B, C, D to a rectangle form (i.e., target 42). As previously mentioned, the transform operation will implement any well-known transform procedure such as, for example, those described in Criminisi, A., Reid, L., and Zisserman, A., "Single View Metrology" *International Journal of Computer Vision* (November, 2000) V. 40, No. 2, pp. 123-148; and Mundy, J., and Zisserman, A., eds, "Geometric Invariance in Computer Vision", MIT Press, 1992, both hereby incorporated by reference in their entireties.

Figure 6:
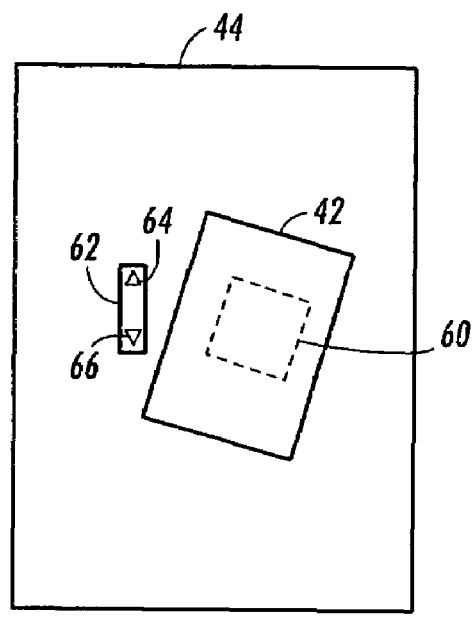
FIG. 6 depicts a skewed target having a hand-held printer and print area.

Next, and as illustrated in FIG. 6, the area where a marking medium such as ink will be deposited on the target 42 is defined by a print area 60. The location of print area 60 may be preloaded into wand 62 by known data transfer and storage processes, such as, for example, described in Denoue et al. U.S. published application '615. The process includes having the user identify the coordinates on the target 42 where printing is to occur. In FIG. 6 the print area 60 is shown with the skewed target 42. Wand 62 is positioned on target 42, and the process then determines the position and orientation of the wand 62 on the target. In one embodiment, wand 62 will have fiducial marks 64, 66 located on a back surface, i.e., the surface facing away from the target 42, as a pattern of distinctively colored and/or patterned symbols unlikely to be found elsewhere on target 42. The distinctive markings 64, 66 facilitate very fast locating and tracking of the wand 62 within the field of vision of imaging system 40, using one or more segmentation techniques that are well known in the art.

As mentioned above, once the wand has been identified, its position and orientation in the target level coordinate system are calculated. The viewing angle of the camera 46 with respect to the target, and the camera's focal length, are both computed using methods known in the art such as described in the aforementioned article by Criminisi, Reid, and Zisserman, "Single View Metrology." In one embodiment, the highly visible fiducial marks 64, 66 affixed in known locations on the wand printer are used in determining wand location. For example, rays passing through the observing camera's aperture, and the fiducial marks 64, 66 provide geometric constraint on the positioning of the wand in the scene. This information is combined with the constraint due to the known height of the fiducial marks above the target surface—when the wand is placed on that surface—to recover the position and orientation of the wand in the target level coordinate system.

Figure 7:
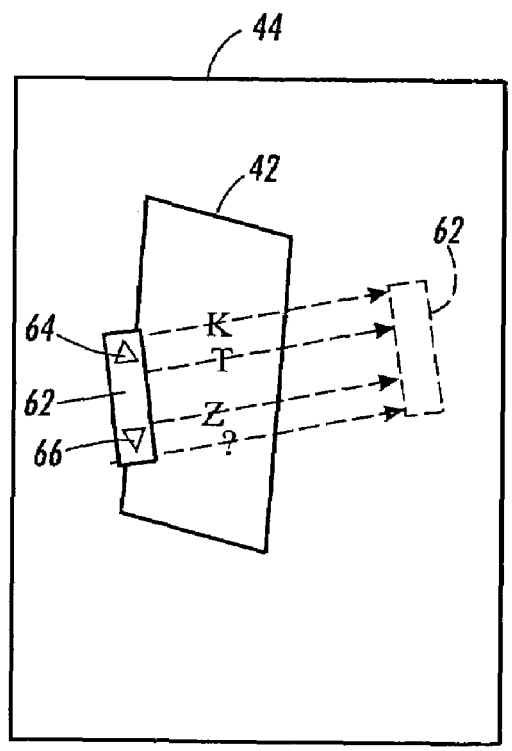
FIG. 7 shows a skewed target such as in FIG. 6 having been printed by the hand-held printer in the print area.

Turning to FIG. 7, upon movement of wand 62, ink ejection occurs when wand 62 is located over print area 60 creating a target image (e.g., 68). More details about this operation of wand 62 will be expanded upon below.

Attention will now be directed to a global level embodiment for determining the position of target 42, particularly when target 42 is skewed or otherwise rotated from an expected position. A global level detection and calibration process is illustrated via the flowchart FIG. 8. In step 70, the imaging system views and collects image data of the global workspace, including image data of the target and a wand within the workspace. Coordinates of this viewed global workspace are calculated based on an origin other than of the target itself. In one embodiment, when the global workspace is a desktop, the origin (0, 0) of the global workspace may be defined as the upper left side of the desk surface. Next, the imaging system is calibrated—using known techniques—to the global workspace 72 by, for example, identification of points such as the origin (0, 0). Based on this global calibration, the position and orientation of the target and wand found therein is obtained. An advantage of using a global level detection and calibration system is that no restriction is placed on the shape or aspect ratio of the target.

Target image data of the target, and wand image data of the wand is then identified from among the collected image data of the global workspace (step 74). The target image data is identified within the image (or camera) coordinate system. In addition, and similar to the discussion related to FIG. 3, once the wand has been identified, its position and orientation in the image (camera) coordinate system is obtained. For example, the viewing angle of the camera 46 with respect to the target, and the camera's focal length, are both computed using methods known in the art such as described in the aforementioned article by Criminisi, Reid, and Zisserman, "Single View Metrology." In one embodiment, the highly visible fiducial marks 64, 66 affixed in known locations on the wand printer are used in determining wand location. For example, rays passing through the observing camera's aperture, and the fiducial marks 64, 66 provide geometric constraint on the positioning of the wand in the scene. This information is combined with the constraint due to the known height of the fiducial marks above the target surface—when the wand is placed on that surface—to recover the position and orientation of the wand in the camera coordinate system. This location information of the target and wand will then be used in the following transformation operations.

A first transform operation is undertaken using known coordinate transform operations, such as through the use of projective geometry, wherein the camera coordinates of the target image and wand are transformed from the image coordinates to workspace coordinates (step 76). The transformation involves the operation of applying transform parameters to the collected target and wand data These transform parameters have been determined in the previous calibration operation.

Thereafter, a second transformation from the workspace coordinate system to the target coordinate system is undertaken (step 78). Thereafter, the wand may be swiped across the target (step 82), and ink drops are ejected from at least one printhead ejector of the wand when it is passed over the print area on the target (step 84). Further, all of the mentioned steps may not be required. For example, in some embodiments determining the print area may not be incorporated in the process.

Figure 8:
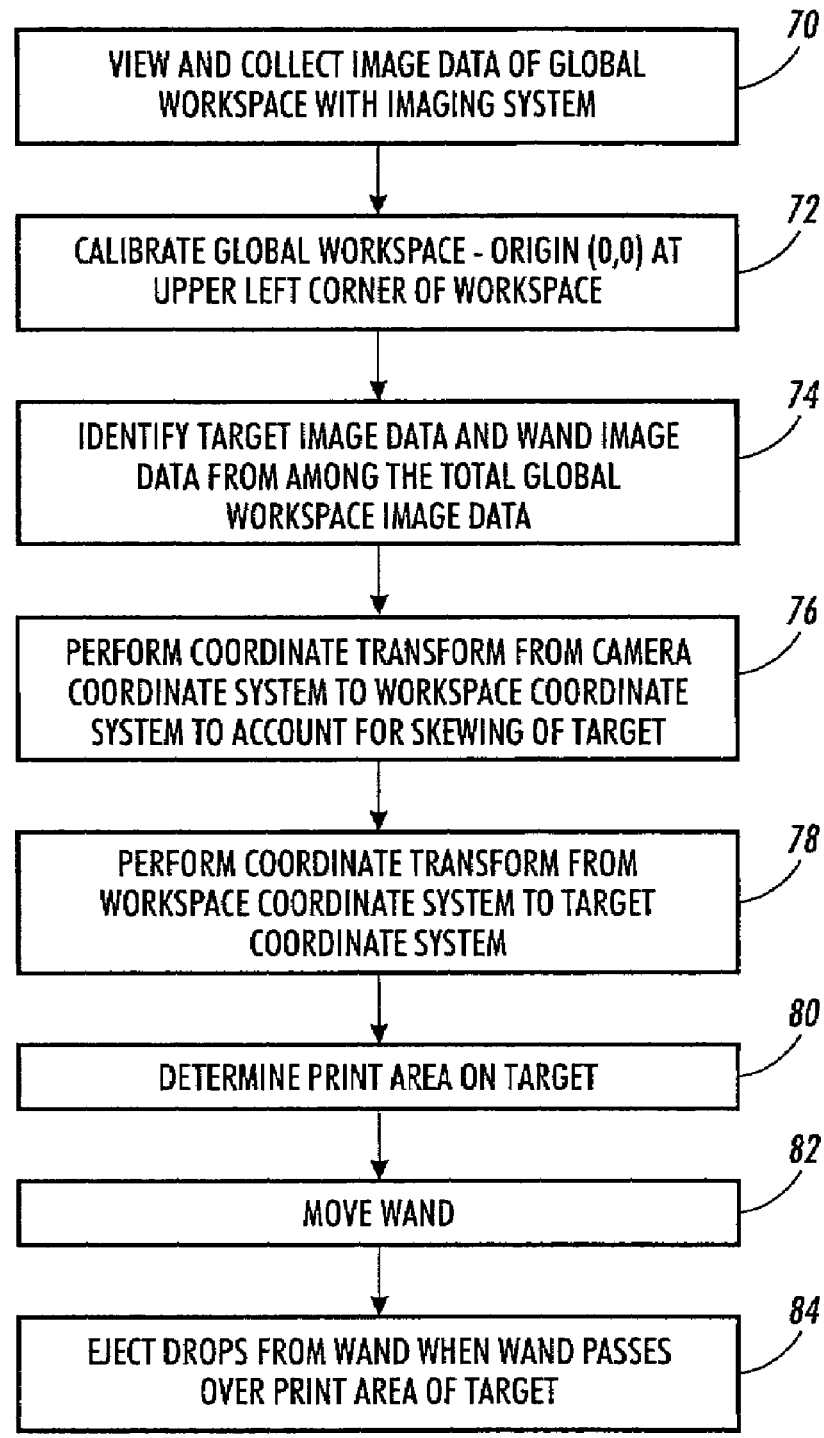
FIG. 8 is a flow chart showing another embodiment for operation of the present application.
Figure 9:
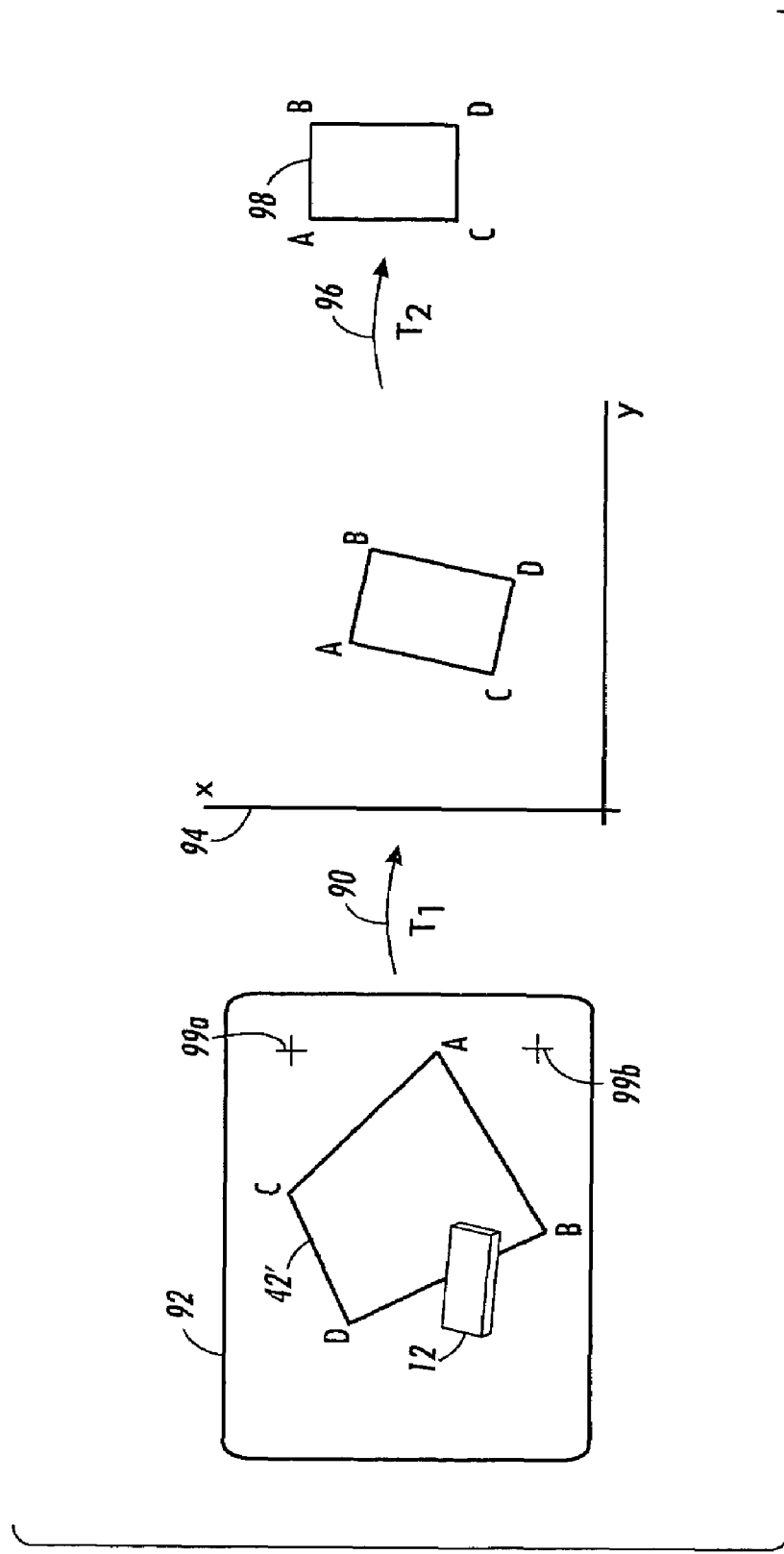
FIG. 9 depicts a system configuration for global workspace sensing.

Turning to FIG. 9, additional details of the global coordinate process described in the flow chart of FIG. 8 is provided. Particularly, FIG. 9 emphasizes the two-step operation for accomplishing the coordinate transform to the target coordinate system. As previously mentioned, prior to attempting to find the location of the target, the camera is calibrated to the global workspace from which the transform parameters are obtained. First transform (T1) 90 represents the process, whereby coordinates of the imaging (or camera) coordinate system 92 (i.e. presented as looking through the camera) are transformed to the global workspace coordinate system 94. Thereafter, a second transform (T2) 96 is obtained by observing the location of where the target's boundaries lie in the imaging system coordinate system, such that a target 98 is obtained whereby skewing, misaligning, etc. of the target 98 have been accounted for, when the printing operation takes place. The global workspace or surface may be defined as a desktop, such as 44 of FIG. 4, where the origin (0, 0) in the global workspace coordinate system is at the upper left-hand corner of the global workspace 44. A number of known coordinate transform operations, such as previously discussed in connection with the first embodiment can be used to perform the transform operations. It is to be appreciated that in some embodiments, use of identifying marks 99a, 99b, for example, may be implemented to assist in the coordinate transfer process.

It is noted the determination of the print area on the target may be undertaken in a manner similar to that in connection with FIG. 6 of the previous embodiment. Additionally, the steps of positioning the wand on the target, determining the position of the wand on the target, moving the wand, and ejecting droplets when over the print area, are similar to that as described in connection with FIGS. 6-7.

The foregoing embodiments of FIGS. 3 and 8, permit the printing of material, such as text or graphics on an angled, or otherwise moved target, such that the material which is printed is aligned with the target irrespective of the target's angle and shape.

These embodiments therefore augment a wand's local motion sensing with target level and/or global level processes to detect the position of the target and wand's position on the target. This information is used to initiate the marking process so as to situate the target image at a predetermined location and/or skew (usually 0-skew), regardless of the starting or subsequent locations and orientations of the wand with respect to the target.

To detect the position of the wand with respect to the target, the imaging system 40 is implemented as a real-time computer vision system that observes the target and the wand's placement thereon. In the embodiment of FIG. 3, by knowing the target will be of a rectangular shape and of a particular aspect ratio, any number of well-known algorithms for detecting shapes (e.g., quadrilaterals) may be applied to identify the target, and to transform imaging (camera) system data coordinates to a target coordinate system. Similarly, the embodiment of FIG. 8 is preferably implemented by having the borders of the target detected against a dark background by any of a number of well-known algorithms for detecting objects (not necessarily rectangles). Thereafter, when the transformation operation is undertaken the coordinates of the imaging system are transformed to workspace coordinates.

The wand is detected either by the previously mentioned fiducial marks affixed to the wand, or by any of a number of well-known model-based object recognition algorithms. From these measurements, in the embodiments illustrated by FIG. 3 and FIG. 8, the relative location of the wand with respect to the target coordinate system is determined by simple coordinate transforms to respective target or global workspace coordinates.

Figure 10:
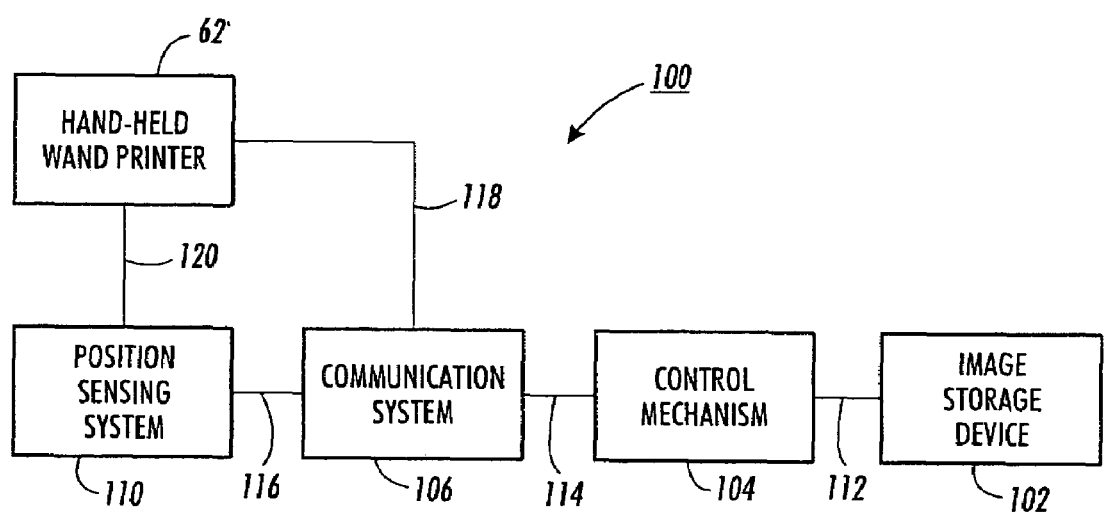
FIG. 10 is a block diagram of an implementation of a target printing system.
Figure 11:
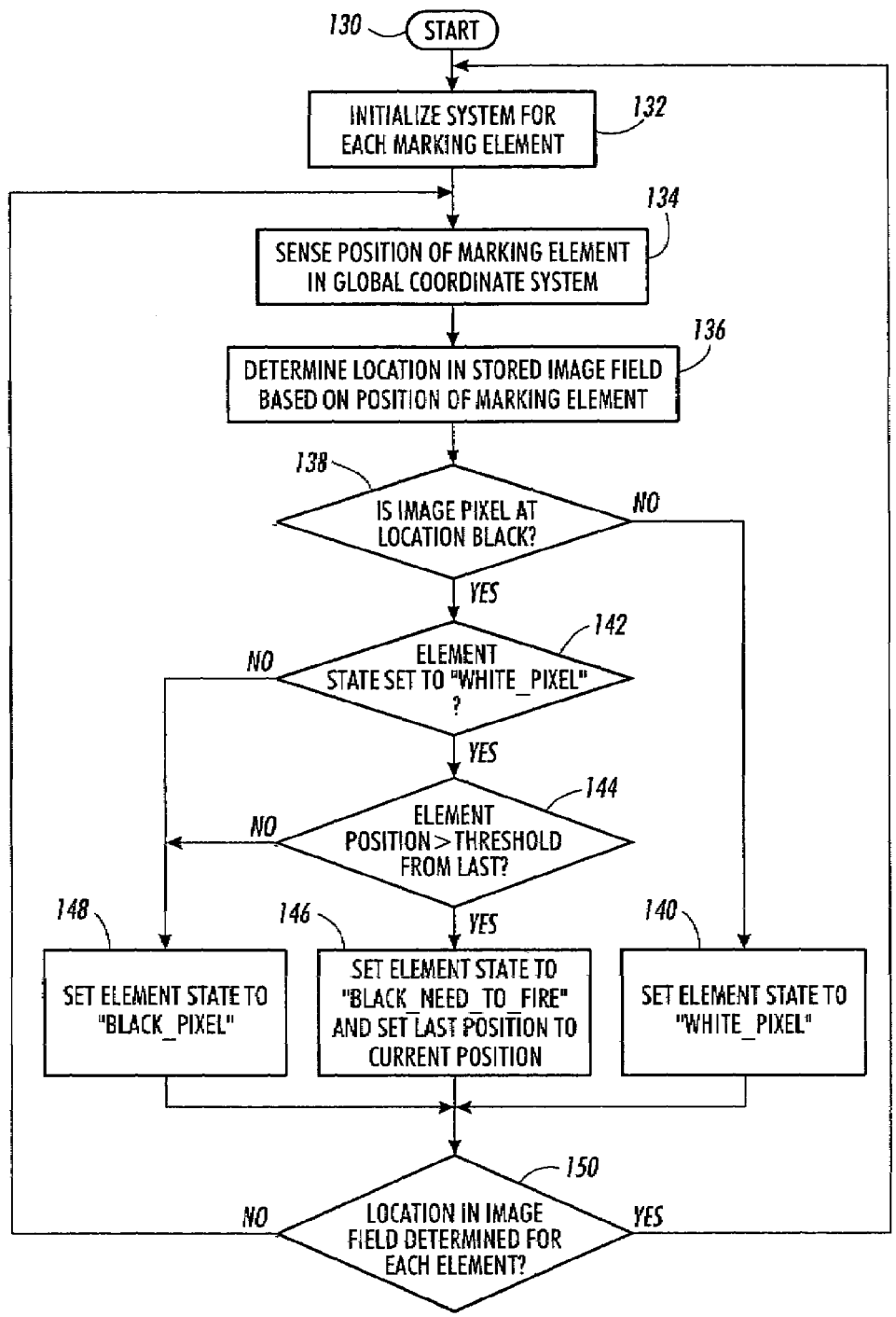
FIG. 11 is a flow chart for an exemplary embodiment of a method for ejecting material such as ink.

FIG. 10 is a block diagram describing an implementation of a target printing system in accordance with the concepts discussed in FIGS. 1-9. FIG. 11 sets forth a flow chart for one exemplary embodiment of a method for ejecting material such a ink, when the swiping begins at any starting location on the target.

In FIG. 10 a target wand printer system 100 includes an image storage device 102, a control mechanism 104, a communication system 106, hand-held wand printer 62 and a position sensing system 110 (such as described in FIGS. 3 and 8—and including imaging system 40). It should be understood that, while these elements are represented separately in the block diagram of FIG. 10, they are not necessarily separate and distinct components, but may be fully or particularly combined into a single and/or multiple devices.

Image data of an image to be printed is stored by the image storage device 102. The image storage device 102 may be any suitable device, either known or hereafter developed, that is capable of at least temporarily storing image data in any known or later developed format. For example, the image storage device 102 may be a hard disk drive, a floppy disk or computer memory where image data such as a portable digital document (PDD) may be stored in various formats, such as portable document format (PDF), or any known or later developed page-description language (PDL), graphics interchange format (GIF), joint photographic experts group format (JPEG), or JPEG file interchange format (JFIF).

The hand-held wand printer 62 may be any suitable device, either known or hereafter developed, that is capable of reproducing the image or producing a representation of the image on the surface of the target. In various exemplary embodiments of this invention, wand 62 includes a printhead, such as an ink-jet print head. Further, since the systems and methods of this application are also applicable to printing on a variety of surfaces, the marking mechanism generally may be any suitable device, either known or hereafter developed, that is capable of reproducing the image or producing a representation of the image on a desired surface.

The position sensing system 110 may comprise any suitable device or arrangement of devices, either known or hereafter developed, that is capable of determining a position of the target at a target level (FIG. 3) or within a defined global workspace (FIG. 8) and which is also capable of determining a position of the wand relative to the target, or other desired surface, as the wand printer 62 is moved across the surface of the target, or other surface. In other words, the position sensing system 110 determines the location of the wand 62 on the surface of the target, or other surface, and tracks wand 62 as it moves. Examples of suitable arrangements for the position sensing system 110 have been previously described.

The control mechanism 104 may be any device or software structure that is capable of accessing the image data from the image storage device 102 and providing instructions to the wand 62 to reproduce the image, or at least a representation of the image. As described further below, the control mechanism 104 uses position information from the position sensing system 110 to determine the portion of the image data that is to be reproduced/represented on each corresponding portion of the target surface. The control mechanism 104 thus provides instructions to actuate the wand 62 appropriately as the wand is moved over the surface of the target.

As shown in FIG. 10, the image storage device 102, the control mechanism 104, the communication system 106, wand 62 and the position sensing system 110 are interconnected by links 112, 114, 116, 118 and 120. The links 112-120 can be wired or wireless links or any other known or later developed element or elements that are capable of supplying electronic data to and from the connected elements 62, 102-106 and 110. Therefore, links 112-120 are intended to represent wireless communication structures permitting wireless communication between imaging system 40 and wand printer 62.

The communication system 106 may comprise any suitable device or arrangement of devices, either known or hereafter developed, that is capable of supplying electronic data from the position sensing system 110 to the control mechanism 104 and from the control mechanism 104 to the wand 62. For example, the communication system 106 may comprise a distributed network, such as an intranet, an extranet, a local area network, a metropolitan area network, a wide area network, a satellite communication network, an infrared communication network, the Internet, the World Wide Web, or any other known or later developed distributed network. The communication system 106 may also comprise wired or wireless links.

The control mechanism 104 may be operated by any suitable method either known or hereafter developed. For example, the method illustrated in the exemplary flowchart of FIG. 11 may be used to operate the control mechanism 104 so that each element of the marking mechanism 108 is actuated as required to print the stored image.

As shown in FIG. 11, the method begins in step 130, and continues to step 132, where once the target has been identified and located, and the wand physically placed on the target, the starting location, orientation and length of the wand 62 are initialized in one of the local target and/or global coordinate systems (dependant on which embodiment is being used) using fixed units having given origin and axes with respect to the stored image. For example, the local target and/or global coordinate systems may be conveniently defined to be measured in inches, originating at an upper left corner of the stored image, with the x axis extending horizontally to the right across top edge of the stored image, and the y axis extending vertically downward along the left edge of the stored image. For many applications, the initial location of the marking mechanism 108 will be along the y axis. Since this application employs local target and/or global position sensing, the wand 62 may assume any starting location. Preferably, the initial location of the wand 62 will be "off" of the image area (60), so that the state of each wand marking element is initialized to "white_pixel" (no printing) and each of a last location of a marking element is initialized to "off_the_image".

Next, in step 134, the motion of the wand 62 is tracked as the wand 62 is moved over the surface of the target. For example, if the position sensing system 110 estimates the absolute x-y position of a pair of sensors relative to the initial location of the sensors, measurements can be referred to as "top_x, top_y" and "bottom_x, bottom_y". The absolute x-y position is thus expressed in the target or global coordinate system. If sensors of the position sensing system 110 provide velocity information about the marking mechanism 108, then absolute position estimates can be obtained by numerical integration.

In the exemplary embodiment of the method shown in FIG. 11, three arrays are maintained, for example, in electronic memory. Each array may contain one entry for each marking element of the wand 62, indexed sequentially from one end. One array is a current-state-array, where each entry has a white-pixel, black-pixel-need-to-fire, or black-pixel value. The other two arrays are a last-fired-x-array and a last-fired-y-array, where each entry has a floating value in the relevant coordinate system. Then in step 136, a coordinate transform is performed to determine the location of the wand 62 in a stored image field pixel coordinate system based on the position of a given marking element of the wand 62 in the target or global coordinate system. Control then proceeds to step 138. In step 138, a determination is made whether a pixel at that location in the stored image is black. If not, control continues to step 140. Otherwise, control jumps to step 142. In step 140, the marking element state is set to "white_pixel". Control then jumps to step 130. In contrast, in step 142, a determination is made whether the marking element state is set to "white_pixel". If so, control proceeds to step 144. Otherwise, control jumps to step 148. In step 144, a determination is made whether the current location of the marking element is greater than a threshold distance from the location at which the marking element was last located.

If the current location of the marking element is greater than a threshold distance from the location at which the marking element was last located, control continues to step 146. Otherwise control again jumps to step 148. In step 146, The marking element state is set to "black_need_to_fire" and the last location of the element is set to the current location of the marking element. Control then jumps to step 150.

In contrast, in step 148, the marking element state is set to "black_pixel". Control then continues to step 150. In step 150, a determination is made whether the coordinate transform has been applied to all of the marking elements. If so, control returns to step 132. If not, control returns to step 134.

It should be understood that various other embodiments of the method for operating the control mechanism 104 may be used. For example, the method used to vary the duration of activation of each marking element based on the velocity of the marking mechanism 108 and the position of a black/white image boundary along the marking element's trajectory, may alter the order or timing at which the last-fired values are set.

The strategy of the method is to look up the desired pixel in the stored image for each location of each marking element to determine if the individual marking elements are to be actuated to eject ink or otherwise mark the surface. Each time a marking element is actuated, the position of that marking element in the target or global coordinate system is stored. A marking element is not actuated if its current location is within a preset threshold distance from the location at which it was previously actuated, i.e., the stored position. This strategy leads to relatively uniform ink application regardless of the velocity or trajectory of the wand 62, up to a maximum velocity depending on the cycle time required to address each of the marking elements.

With further attention to the ejecting process in the embodiments represented by the flow charts of FIGS. 3 and 8, included are steps which determine a print area on the target where the wand will become active. By this design, a user may swipe the wand across the target outside of the print area, and no drop ejection will occur as the control mechanism will not provide instruction for ejection. As mentioned, in the previous embodiments, the location of the print area is a pre-determined location input into the system's software. Benefits obtained by providing the print area in this manner include, allowing the user to begin to sweep at any location on the target without inadvertently starting the printing process. It is only when the system determines that location of the wand is within the print area—by the tracking and location determining operations—that the drop-ejection process will begin.

In some situations the rigidity of the pre-determined print area, i.e., which is incorporated as a software operation, does not provide sufficient flexibility. Therefore, in an embodiment shown in FIG. 11, this pre-determined print area positioning, is replaced with the generation of a print area obtained by the use of pointing a finger or other pointing object into the target such that it is viewed by the imaging system. Finger or pointer tracking concepts for moving data has been described, for example, in U.S. Pat. No. 5,511,148 to Wellner and U.S. Pat. No. 6,067,112 to Wellner et al., these patents describe systems for generating new documents from originals containing text and/or images employing, e.g., a camera-projector system focused on a work surface. In practice, an original paper document lies on the surface and becomes part of an interface to a copy machine as various interactions are carried out on the text or images. Text and images are selected and manipulated by the user through the use of pointing with fingers or pointers and tapping on the surface.

Figure 12:
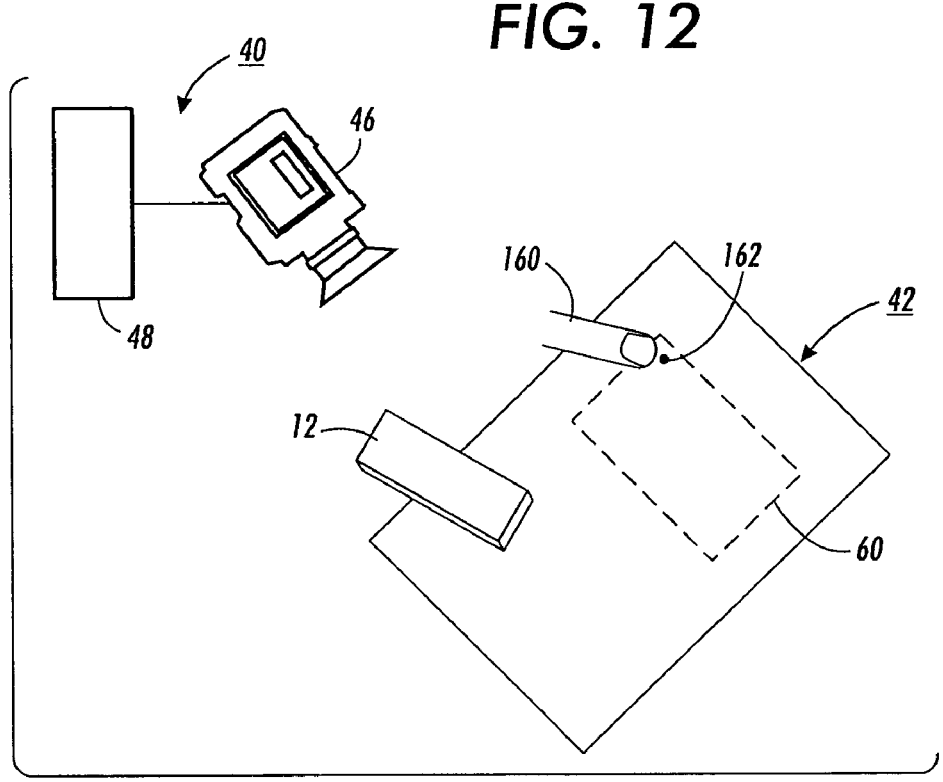
FIG. 12 depicts a method of positioning a print area by a pointing operation.
Figure 13:
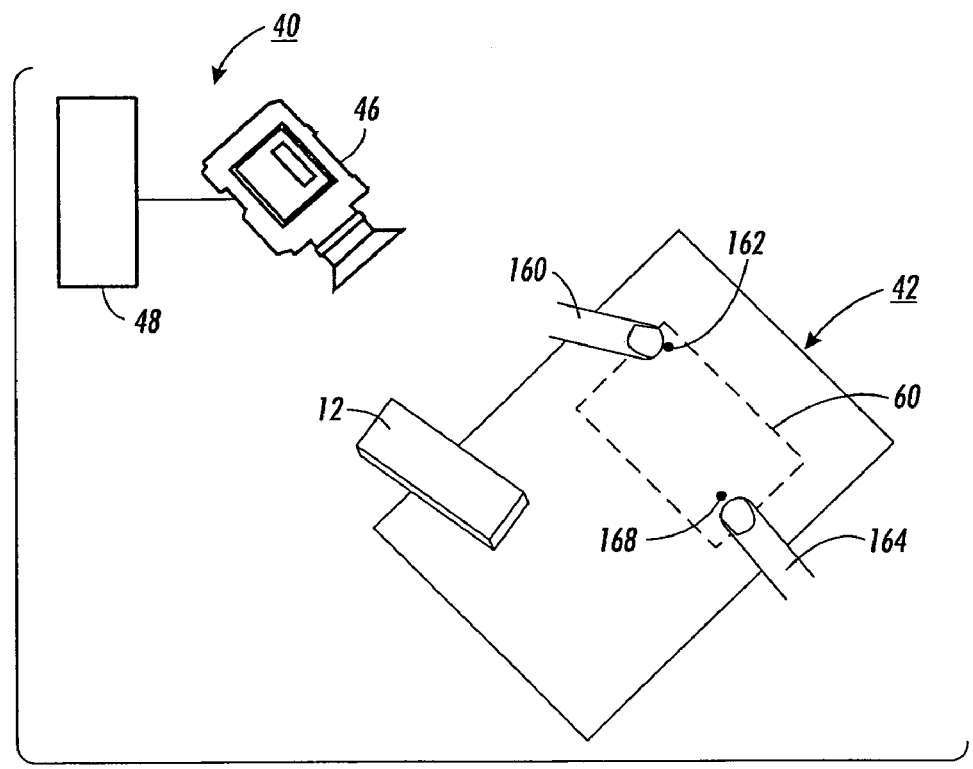
FIG. 13 illustrates the pointing operation using a plurality of pointers.

The present application implements such an interactive system to identify where a start-printing operation will occur. For example, in FIG. 12, pointer (finger) 160 moves onto the surface of target 42, wherein it is imaged by imaging system 40. Imaging system 40 uses this information to indicate to the wand 62 that location or point 162 is the origin of a print area, or in some embodiments a start location of a printing operation. The data obtained by pointer (finger) 160 may in one embodiment be combined with previously stored information about the overall size of the print area 60. In this embodiment, therefore, location or point 162 is understood as being the origin (0, 0) location of print area 60, and from this designated origin (0, 0), the system then defines the entire print area 60 on the target 42. By this operation, the ability of the present system to begin printing at any location within the print area is alternatively achieved. It is to be understood that alternative embodiments to pointer placement system are also available. For example, as disclosed in FIG. 13, and similar to what is disclosed in the Wellner '112 patent, multiple pointers (fingers) 160, 164 may be used to designate a start point 166 and an end point 168. Using these start and end points, the print area may also be defined.

The above embodiments achieve the level of appropriate placement by coordinating the hand-held wand printer actions with the computer vision system containing both real-time tracking of simple objects and delay-time document image analysis. The state of the art of real-time tracking is sufficient to permit detection and tracking of a finger-pointer or stylus over the image. The tracking operation is programmed to detect a target point or points indicated by the trajectory of the pointing object or objects that enter the scene, approaches and slows and then stops at a location in the scene, then withdraws in the direction from where it entered. The points identified by the target pointer are then taken as the approximate initial position for printing.

This pointer mechanism permits a refined registration of the printed image according to markings on the target surface. For example, as illustrated in FIG. 14, it may be desirable to align and space text lines printed by the wand within ruled lines preprinted on paper 170. By placing pointer (finger) 160 between the preprinted lines 172, 174, the system may apply a rule that the text of succeeding lines will also be placed within other identified designated preprinted lines.

Turning to a further embodiment, as shown in FIG. 15, the use of the pointer (finger) 160 may be implemented with a form target 176, defined with blank spaces 178, 180, 182 which are required to be filled in. In this design, the system is constructed to print only in individual boxes 178, 180, 182, 184.

To extend the concepts described above, it is considered that the target surface, such as form 176, may govern the content of the material to be printed. For example, it may be beneficial for users to be able to place a preprinted form under an imaging system which then reads aspects of the form and determines the information from the user's database to be inserted into particular fields identified on the form. Then, this information may be printed into the correct fields by swipe printing with the wand.

The intelligence of determining information of forms to be entered, may be accomplished by incorporating form recognition software such as ScanSoft OmniForm™ (a trademark of ScanSoft, Inc.). In this embodiment, a high-resolution image of the target surface is captured using the imaging system positioned above the target. The digital image is sent to the form's recognition software which identifies fields by location on the form and field name. In this embodiment, the user will maintain a database pairing the user's particular data with the names of fields on the forms where this data should be written. The system then generates a source image for wand-swipe printing that contains the appropriate data, rendered as text, sized and positioned to fit the fields on the form. At swipe print time, the hand-held printer is tracked by the real-time computer vision system as previously discussed, in order to register printed marks with their intended locations on the target.

Using the above-described concepts, a variety of specific applications which incorporate the those concepts permit for the improvement of existing devices and/or new devices. More particularly, International Application No. WO 02/023431A to Walling, entitled "Electronic Stamp", shows an electronic stamp or method for performing stamping, hereby incorporated by reference. Commonly, when targets (i.e., pages, etc.) are being stamped, the targets may be skewed or otherwise out of alignment, therefore with existing electronic stamps, the stamped image, if positioned parallel to some reference point, will be skewed as to the target. Using the positioning mechanisms described above, the present application provides for a customizable electronic stamp using concepts of the described wand printer as in the form of a swiping device or in the configuration of the stamp shown in the Walling ('431A) patent application.

Figure 16:
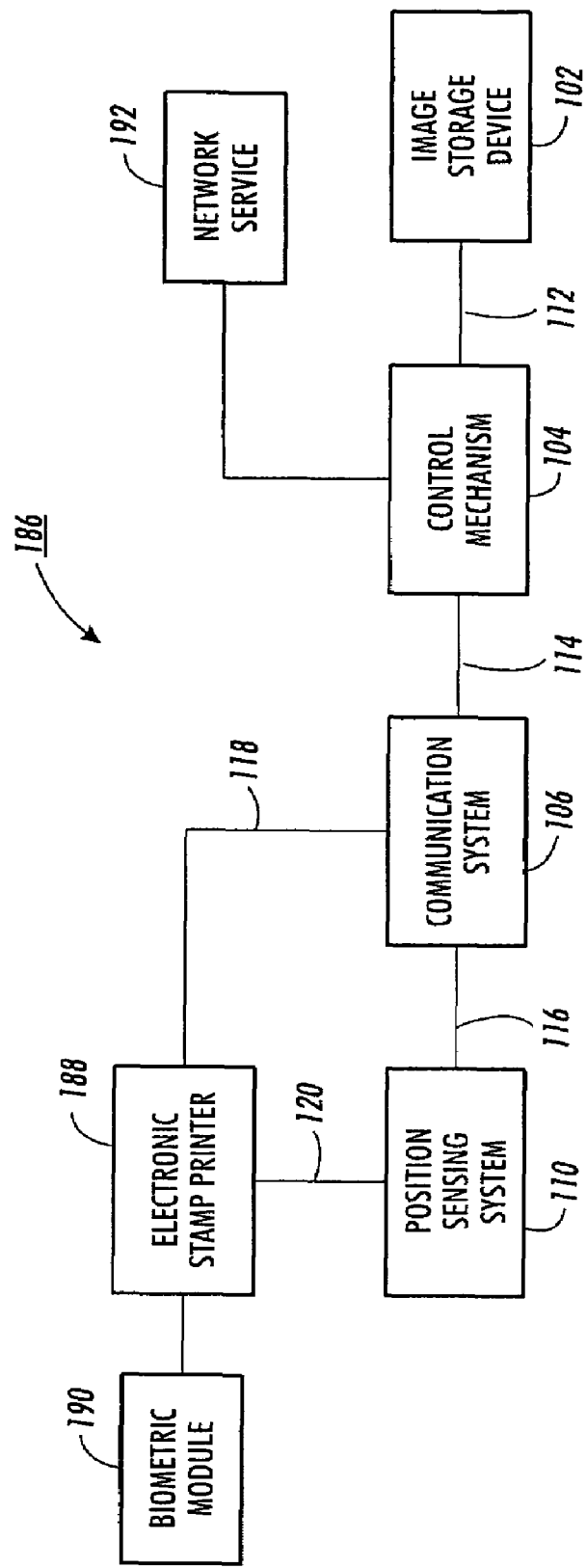
FIG. 16 depicts an application of the exemplary embodiments as an electronic stamp.

Turning to FIG. 16, the target wand printer system 100 of FIG. 10 may be configured with software, which permits for a customizable stamp system 186, where the wand 62 of previous figures is controlled and used as an electronic stamp printer 188. Particularly, date and time elements may be changed automatically by an internal clock (i.e., a microcontroller of the control mechanism 104), and time of sweep imprints can be recorded accurately down to the second, via use of the control mechanism 104. In alternative configurations of this device, the date and time may be designed to be unchangeable by a user, thus thwarting falsification of documents. The implementation of the wand printer as a stamp printer 188 is, in an embodiment, configured to be downloadable with logos and seals generated by the image generation processes previously described. In a further embodiment, the downloaded information may contain embedded data or time-variable patterns or glyphs to thwart forgery. Stamp imprint can also contain embedded data referring to the identity of the document the stamp is used on, and identify the used "logged-in" to the stamp. The stamp may be configured to contain a biometric identity module 190 such as a thumbprint reader to establish identity and authority for its use. In one embodiment, the device might be programmed to print only when held by a person with a certain thumbprint, rendering it of no value if stolen by forgers. The printed images, materials and data may be generated locally within the device or may be received via a network service 192, which may be any external network service 192, which may be data is provided to the device. The network service 192 communicating with the device via any appropriate communication link, including but not limited to an Intranet or Internet.

Figure 17:
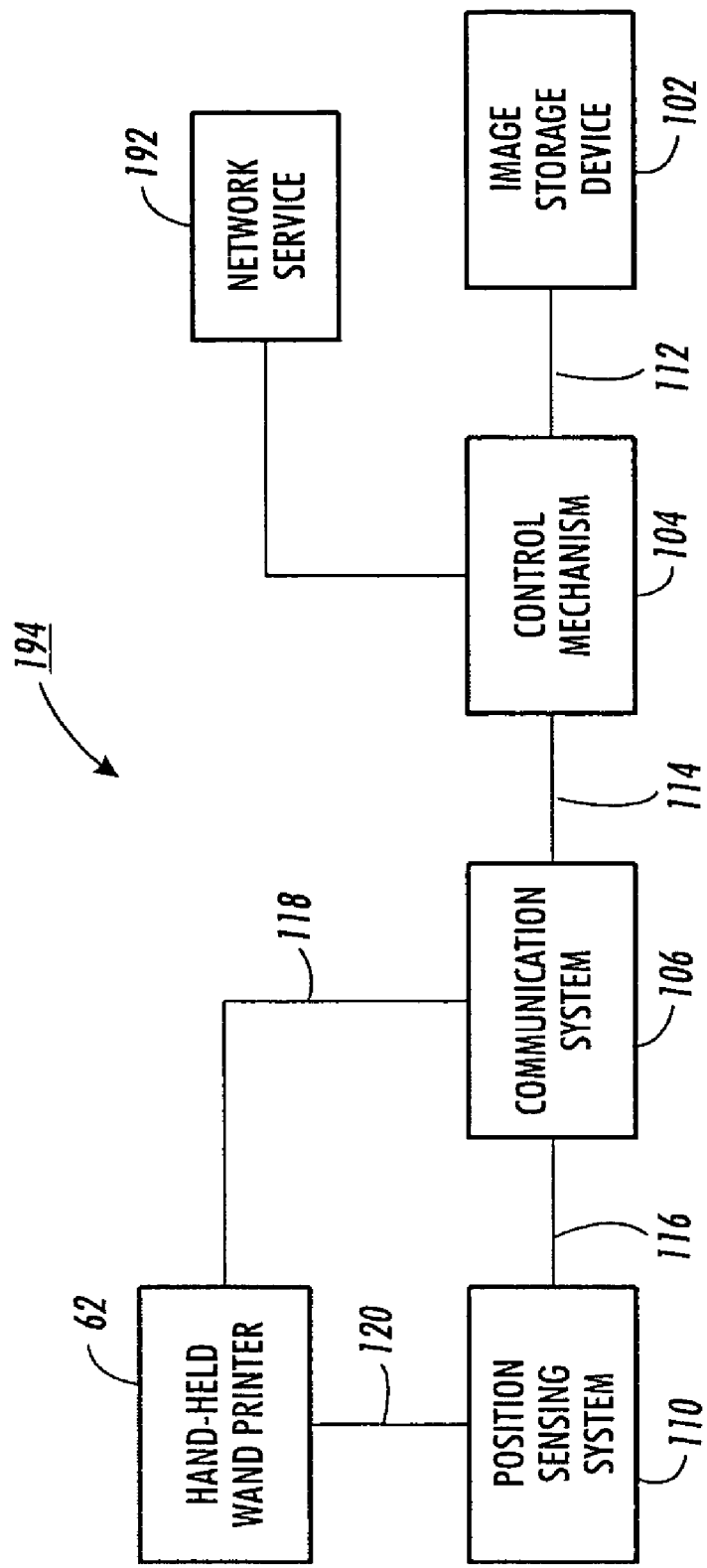
FIG. 17 depicts an application of the exemplary embodiments as an address printer.

In another application implementing the concepts described above, the system 100 of FIG. 10 may be configured as an address printing system 194 where wand printer 62 is configured as an address printer, as shown in FIG. 17. Examples of existing address printers include the Bobry '326 and '900 patents. However, as previously noted, if the envelopes or other materials on which the address are being printed are skewed from a particular direction, the output address information may be skewed on the envelope.

Therefore, the present concepts provide for an address printer which ensures proper alignment of the address, making it easy to copy material from an electronically stored address book onto envelopes. In this instance, the user, as in previous instances with the wand stamp, may use the pointing mechanism described above. Addresses may be input into the system via electronic data communications through the use of a communication system such as communication system 106. When a desired address has been selected, the wand printer configured as the address printer device will generate a bitmap image to be printed containing the address. In addition, the bitmap address image may automatically add the postal barcode for the specific address. The barcode may be found by one of storing it in a hidden field within the address, having it computed from the textual address information according to an algorithm approved by the postal office and stored in the control mechanism 104, or it may be obtained via a network service 192. When the address is swipe-printed onto the envelope, the postal bar code is swipe printed as well. The implementation may be useful in bulk mailing to provide an improved delivery speed and accuracy.

Figure 18:
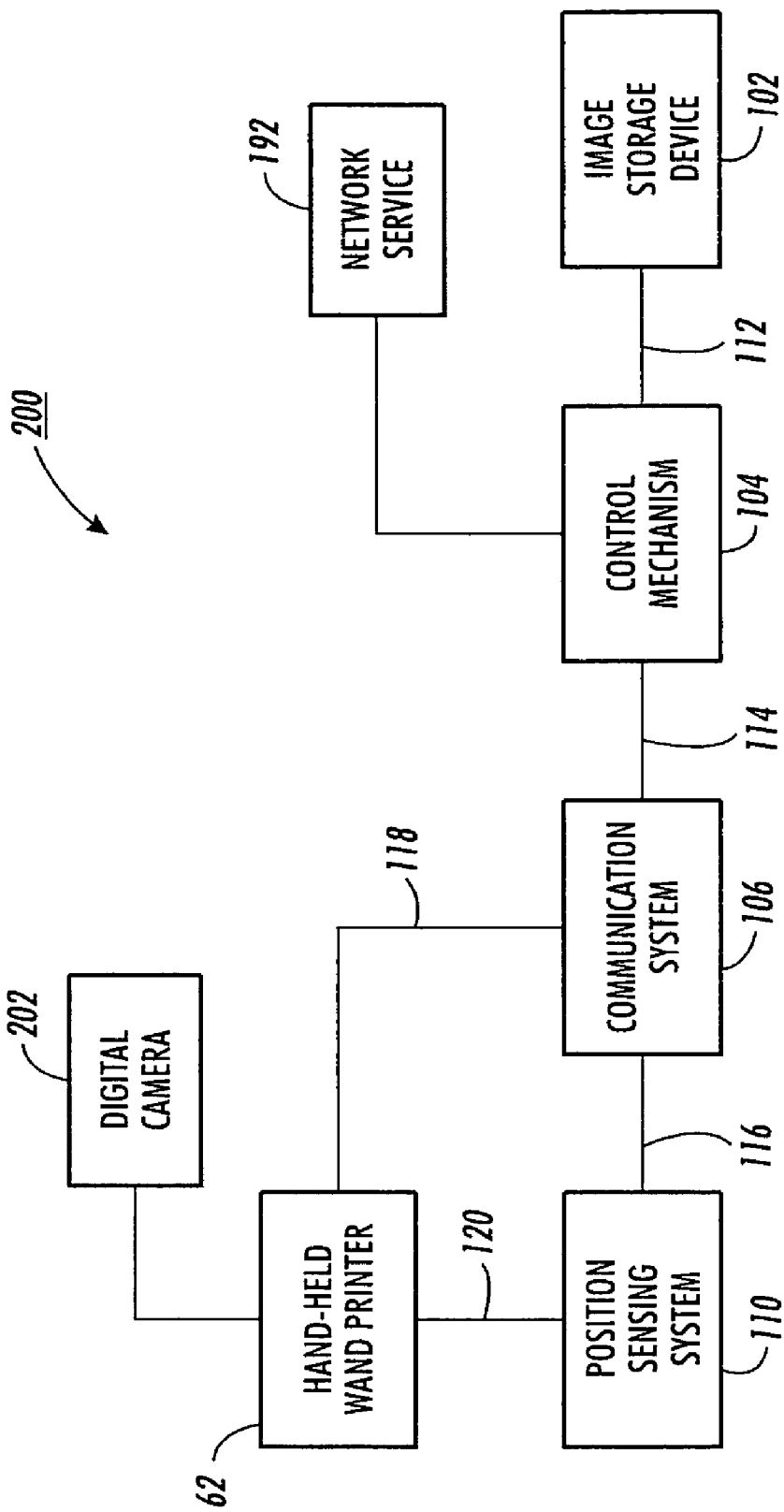
FIG. 18 shows an application of the exemplary embodiments as a photograph previewer system.

Turning to FIG. 18, illustrated is a photograph previewer system 200 which operationally incorporates a digital camera 200, the wand printer 62, either attached or integrated with the digital camera 202. In essence, digital camera 202 is incorporated in the system with components similar to that of FIG. 10. In this application, the storage 102 may be defined at least in part as an on-line repository for digital photographs. After a photograph has been taken with the digital camera 202, it is sub-sampled and dithered so that it may be printed at a reduced resolution by the wand printer 62. This resolution will result in a reduced image quality, which will still be sufficient to provide a reasonable representation of the photograph. At the time the photograph was taken, a unique Universal Resource Locater (URL) is generated from the storage 102, via communication system 106 or a network service 192. The URL may, for example, be based on a device ID and the time of photograph. An embedded data coding for this URL is optionally created and be placed in storage for printing by the wand printer 62. This way the photographic image printed by wand printer 62 contains both the photograph image and the URL in human-readable and optionally in embedded data formats. At any time such that the digital photograph is transferred to the repository 102, an access path via the assigned URL will be created so that users may access the image from the Internet or a Intranet via for example, the network services module 192. Using the improved wand-generated preview print, a user may swipe-read the URL using a reading device such as a CueCat or other data reader, and immediately have their browser taken to the web page for the full resolution photograph. This web page may permit downloading of the full resolution image, or other services such as sending to a local digital photo-finishing service.

Figure 19:
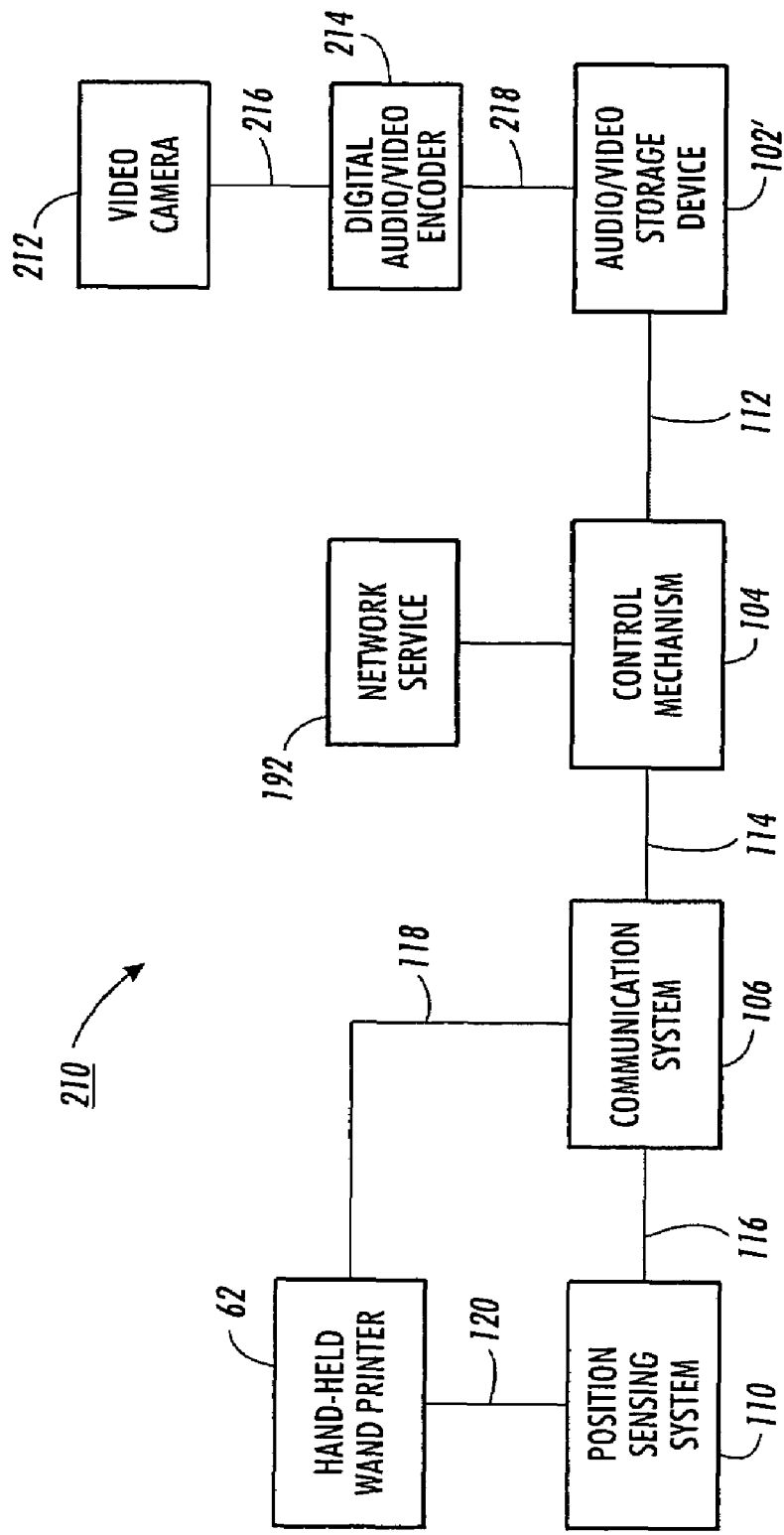
FIG. 19 illustrates an application of the exemplary embodiment as an audio/autograph system.

Turning to FIG. 19, illustrated is a personalized audio/autograph system 210 which incorporates concepts of the described printing system. System 210 may be implemented, for example, at a sports memorabilia show, a celebrity appearance, or any other situation where a person is interacting with another person or group of people.

In one embodiment of system 210, there will be two user roles, the "celebrity" and the "fan." A video camera 212 is provided to record the interaction between the celebrity and fan during their meeting. Particularly, a live recording is made of the interaction between the celebrity and the fan, including the celebrity greeting the fan, talking to the fan, and providing the fan with an autograph, or any other action related to the meeting. By this process, the overall interaction is captured both in video and audio. The captured video and audio information is transmitted to a digital audio/video encoder 214, via connector 216. This information is then in turn stored in audio/video storage device 102'. Transmissions within the system may be wireless, or wireline, Internet, Intranet or other appropriate communication network. Once captured and stored, the audio/video data from video camera 212 can then be used in a variety of fashions in system 210.

In one use, a single frame of the stored video data is selected by control mechanism 104 and delivered across communication system 106 to hand-held wand printer 62. This information may be combined with an embedded pointer, which points to the stored digital date, such as a URL, received from network service 192, which has also been transferred to hand-held wand printer 62. Then, when a celebrity "signs" a fan's autograph book, the celebrity will swipe-print an image containing the single frame of video, showing the celebrity and fan together or any other image of the meeting, as well as a human readable pointer, such as a URL data image. Optionally, an embedded URL, as well as additional stored image material, which may include the celebrity's logo, an image of their signature, or whatever is deemed appropriate for satisfaction of the fan may be printed. By this arrangement, the fan is able to have an image of himself and the celebrity printed directly into their autograph book. It is to be appreciated the embedded data encoding of the URL can be created in a widely available format, such as for the previously noted CueCat or other data reader.

Equipped with this printed material, the fan may enter the human readable pointer (e.g., URL) at their personal computer (connected to an appropriate communication link e.g., Internet connection). Then in a standard fashion, their browser will access a web page containing the audio/video data stored in audio/video storage device 102', whereby the user may view the recorded interaction between themselves and the celebrity. The celebrity may have designed the system to control what video and/or audio appears on the web site as related to this interaction. Alternatively, for the embedded URL, when the fan has an appropriately equipped reader, the fan is able to swipe-read the bar-coded URL, thereby also directing the browser to the celebrity's web site. The web page may also be linked to promotion materials and merchandise for the fan to purchase. Still further, the web page can be customized for the particular fan encounter to include a higher resolution digital photo similar to or unique from that photo image which was printed in the autograph book of the fan meeting the celebrity or any other type of customization. It is to be appreciated the pointer can also be used in other embodiments as a link to the stored digital data permitting the mentioned higher resolution images, as well as for orthographic correction or media extending (i.e., video, audio) among other uses.

Figure 20:
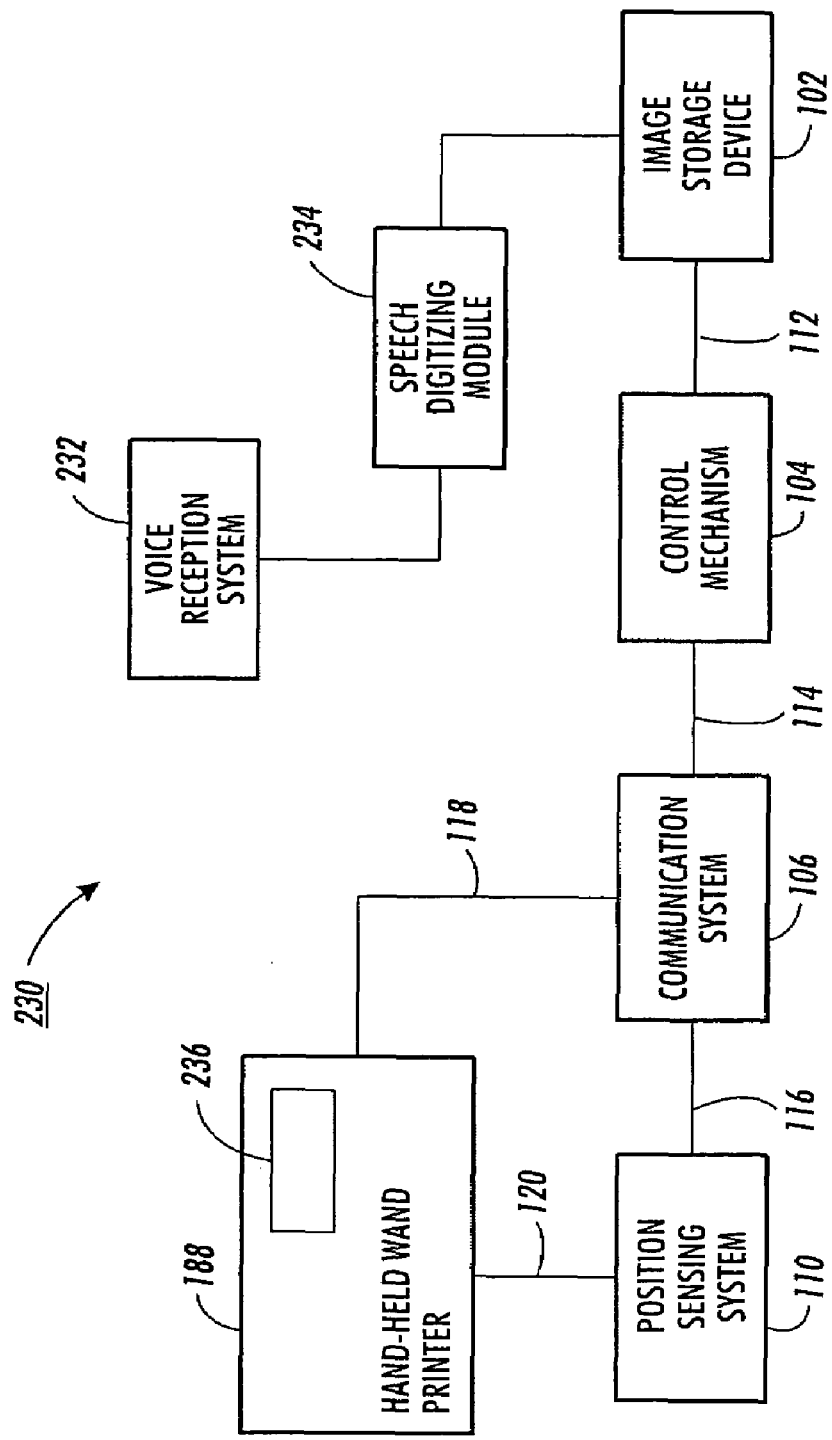
FIG. 20 depicts an application of the present exemplary embodiments as a speech-to-text system.

Another application, in which the improved wand printer concepts may be incorporated, is a voice-to-print system 230 which recognizes vocalized speech in order to control content of printed material, as shown in FIG. 20. In this embodiment, components of the imaging system 100 of FIG. 10 is again implemented, at this point with a voice reception dictation system 232, such as a cell phone, microphone-equipped PDA, or other electronic device. The received speech is transcribed into a digital format, such as ASCII text, at speech digitized module 234, by any known voice transcription, voice translation software may be a variant such as Dragon Dictate. The digitized speech from module 234 is then transmitted to image storage device 102. These voice data files are used and rendered as a text image wand printer 62, printing a source bitmap of the data files.

This embodiment may also incorporate a display/editor 236 to display and permit editing of the transcribed voice files. The display/editor 236 may be incorporated as part of wand printer 62 or as a separate component. This design allows a user to view, the material to be printed, and provides for editing the digitized speech prior to the printing operation. It is to be appreciated each of the previous embodiments of wand printer 62 may incorporate a display editor design such as shown in FIG. 20.

Figure 21:
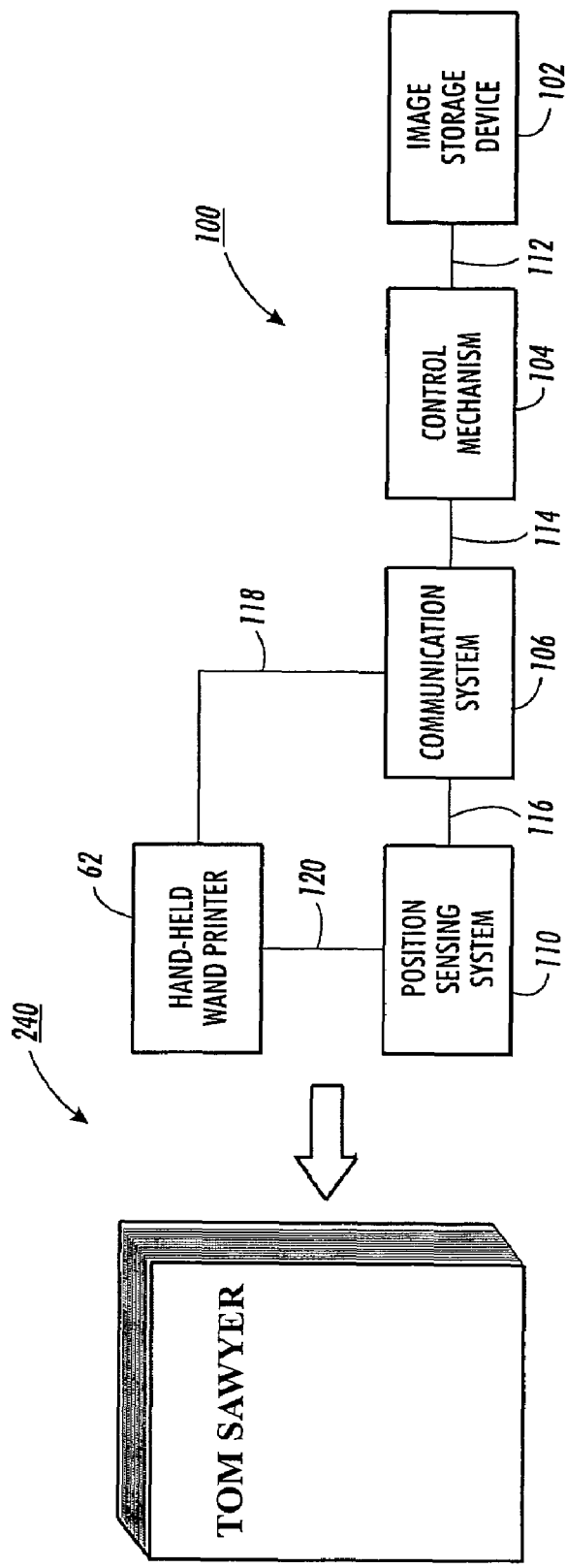
FIGS. 21 and 22 illustrate an application of the exemplary embodiments as a personalized book printing system.
Figure 22:
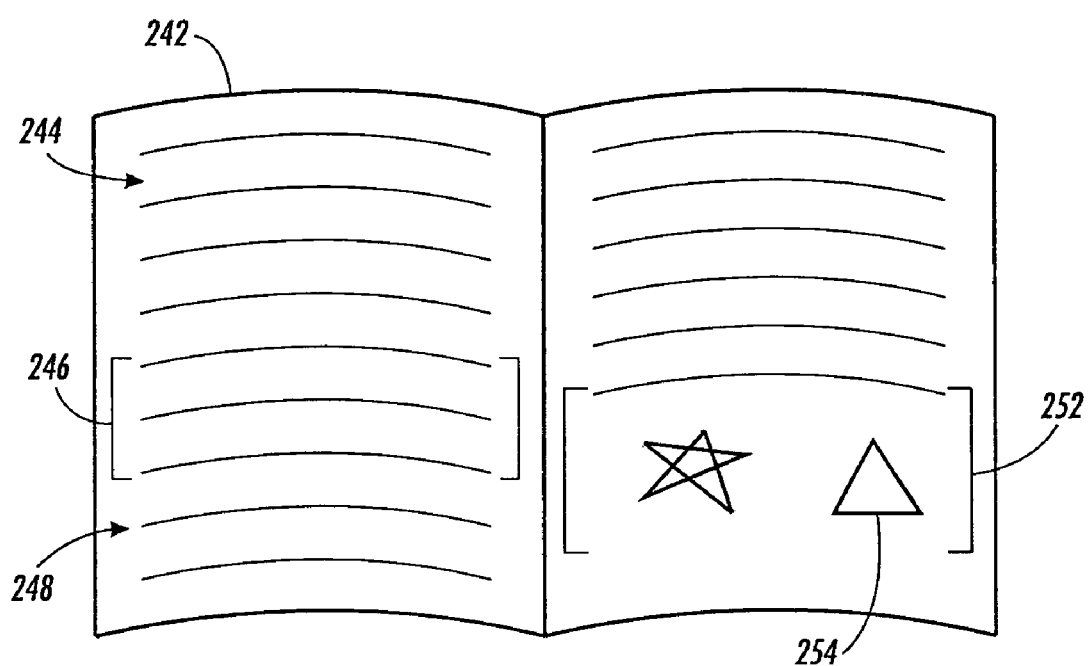

Turning to FIG. 21, the concepts of the present wand printer system are implemented in association with a customized book printing system for generation of a customized book 240. Particularly, in this application, a pre-bound volume of blank pages 242, such as in a book format, is sold to a user, along with the rights to obtain the text to the book as it is published. The book may be published in, for example, a serialized format, where one chapter per week is electronically provided to the user. The transmission of the electronic formatted chapter can occur-in many different ways, including via an e-mail message to the user, permitting the user access at a secured web site, a physical transmission on a disc or CD, or any other way of providing the electronic information to the user in a format wherein the image data, i.e., text and graphics of a book, are provided in a format acceptable for entry into the system 100. It is to be appreciated, that the format of providing a chapter a week may be altered in any appropriate manner, such as the full book being provided at one time, or sections provided over different times rather than the chapter-per-week parameter. Once the digitized information of the book is stored in the wand printer system 100, a user may print the stored material according to their own specifications. Particularly, in FIG. 22, the book pages 242 may be customized whereby an initial section of a page includes text 244 corresponding identically to the electronic downloaded version. However, at section 246, the user has inserted notes or comments which they themselves have generated. Thereafter, at section 248, the user has returned to printing the text as electronically downloaded. Section 250 shows that not only can notes or comments of the user be inserted within the book, but graphics 254 may also be inserted. This system configuration, therefore, illustrates the user's ability to intersperse material between sections of text whose printing they control by the use of wand printer 62. This permits the generation of customized books not previously obtainable.

While this invention has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention. In particular, while the exemplary embodiments described above involve a target, it is to be understood that the systems and methods of this invention may be used with any suitable surface or medium.

The invention claimed is:

1. A hand-held printer system for printing on a target, comprising:
   a hand-held printer;
   a target position sensing system that senses a position of the target;
   a hand-held printer position sensing system that senses a position of the hand-held printer relative to a printing surface of the target; and
   a control mechanism that actuates the printing by the hand-held printer based on the sensed position.

2. The system according to claim 1, wherein the hand-held printer position sensing system is configured to provide the control mechanism with position data, wherein the control mechanism activates the hand-held printer to generate a target image on the target which is aligned with a border of the target at a non-skewed angle irrespective of the position of the target.

3. The system according to claim 1, wherein the target position sensing system is configured to sense a position of the target.

4. The system according to claim 1, wherein the target sensing system is a target level sensing system, and the location of the target is determined with reference to the target itself.

5. The system according to claim 4, wherein the target level sensing system is configured to sense the position of the hand-held printer, when located on the target.

6. The system according to claim 4, wherein the target is a rectangle of a known aspect ratio.

7. The system according to claim 1, wherein the target sensing system is a global workspace level sensing system, and wherein the location of the target is determined with reference to the location of the target within the global workspace.

8. The system according to claim 7, wherein the global workspace level system is configured to sense the position of the hand-held printer, when located on the target.

9. The system according to claim 1, wherein the hand-held printer is configured to only be activated for printing when in a printing area on the target.

10. The system according to claim 9, wherein the system is configured to define the print area via a pointing system.

11. The system according to claim 9, wherein the print area is defined as locations between ruled lines of the target.

12. The system according to claim 9, wherein the print area is defined as at least one entry block on a pre-printed form.

13. The system according to claim 12, wherein the control mechanism is configured to control the hand-held printer to position appropriate information into the at least one entry block.

14. A method for marking on a surface using a hand-held printer, comprising:
   determining a position of a target on which an image is to be printed;
   adjusting for a deviation of the position of the target from an expected location;
   providing data to the hand-held printer quantifying the deviation;
   sensing a position of the hand-held printer relative to a surface of the target; and
   activating the hand-held printer to generate markings on the surface of the target, based on the sensed position of the hand-held printer and the quantified deviation data.

15. The method according to claim 14, wherein the activating step includes generating a target image on the target which is aligned with a border of the target at a non-skewed angle irrespective of the position of the target.

16. The method according to claim 14, wherein the determining step includes determining the position of the target at a target level, wherein reference is made to the target itself.

17. The method according to claim 16, wherein the determining step is undertaken knowing the target is a rectangle and knowing an aspect ratio of the target.

18. The method according to claim 14, wherein the determining step includes determining the position of the target, based on reference to a global workspace within which the target is located.

19. A printing system comprising,
   a device for generating data to be printed; and
   a hand-held printer system for printing on a target, including,
      a hand-held printer,
      a target position sensing system that senses the position of the target,
      a hand-held printer position sensing system that senses a position of the hand-held printer relative to a printing surface of the target, and
      a control mechanism that actuates the hand-held printer based on the sensed positions.

20. The system according to claim 19, wherein the data generating device is a wand stamp.

21. The system according to claim 19, wherein the hand-held printer is an address printer.

22. The system according to claim 19, wherein the data generating device is a digital camera.

23. The system according to claim 19, wherein the data generating device is a video camera which obtains audio and video data, and wherein the obtained audio and video data is stored in a system data storage device as digital data in a digital format for use by the hand-held printer system for printing an image.

24. The system according to claim 23, wherein the system data storage device is configured to store data in addition to the audio and video data, including data which points to off-system data maintained in an off-system data storage device.

25. The system according to claim 24, wherein the printed image includes the pointer data in human readable form which points to the off-system data maintained in the off-system data storage separate from the system data storage.

26. The system according to claim 25, wherein the human readable data is in the form of a URL.

27. The system according to claim 19, wherein the device includes a microphone system configured to capture, digitize and store a digital version of words spoken into the microphone system, for printing of the stored data.

28. The system according to claim 19, wherein the device includes a means for printing a customizable digitized book.

* * * * *